US012464968B2

(12) United States Patent
Setterdahl (10) Patent No.: US 12,464,968 B2
(45) Date of Patent: Nov. 11, 2025

(54) POSITION MONITORING SYSTEM FOR AGRICULTURAL SYSTEM (71) Applicant: CNH Industrial America LLC, New Holland, PA (US)

(72) Inventor: Sven Nathaniel Setterdahl, Maquon, IL (US)

(73) Assignee: CNH Industrial America LLC, New Holland, PA (US)

( * ) Notice: Subject to any disclaimer, the term of this patent is extended or adjusted under 35 U.S.C. 154(b) by 392 days.

(21) Appl. No.: 18/081,289

(22) Filed: Dec. 14, 2022

(65) Prior Publication Data
US 2024/0196783 A1    Jun. 20, 2024

(51) Int. Cl.
A01B 79/00    (2006.01)
G05D 1/00    (2006.01)

(52) U.S. Cl.
CPC ......... *A01B 79/005* (2013.01); *G05D 1/0891* (2013.01)

(58) Field of Classification Search
CPC .......................... A01B 79/005; G05D 1/0891
USPC .......................................................... 701/50
See application file for complete search history.

(56) References Cited

U.S. PATENT DOCUMENTS

| | | |
|---|---|---|
| 7,054,731 B1 | 5/2006 | Lange et al. |
| 7,142,956 B2 | 11/2006 | Heiniger et al. |
| 7,354,057 B2 | 4/2008 | Milner et al. |
| 7,415,771 B2 | 8/2008 | Harrill |
| 7,580,783 B2 | 8/2009 | Dix |
| 8,190,364 B2 | 5/2012 | Rekow |
| 8,626,408 B1 | 1/2014 | Satzler et al. |
| 9,170,101 B2 | 10/2015 | Stieff |
| 9,232,688 B2 | 1/2016 | Kormann et al. |
| 9,374,939 B2 | 6/2016 | Pickett et al. |
| 9,706,697 B2 | 7/2017 | Wilkening et al. |
| 9,926,007 B2 | 3/2018 | Maniar et al. |
| 2006/0225310 A1 | 10/2006 | Koch |

(Continued)

FOREIGN PATENT DOCUMENTS

WO    2008064892 A1    6/2008

OTHER PUBLICATIONS

Cariou, Christophe et al., "Path following of a vehicle-trailer system in presence of sliding: Application to automatic guidance of a towed agricultural implement," Nov. 22, 2010, pp. 1-7, IEEE/RSJ, https://www.researchgate.net/publication/224200916_Path_following_of_a_vehicle-trailer_system_in_presence_of_sliding_Application_to_automatic_guidance_of_a_towed_agricultural_implement.

*Primary Examiner* — Mahmoud S Ismail
(74) *Attorney, Agent, or Firm* — Fletcher Yoder, P.C.

(57) ABSTRACT

A position monitoring system for an agricultural system includes a light emitter configured to output a light, a sensor array having a plurality of sensors configured to receive the light output by the light emitter, and a control system configured to determine at least one sensor of the plurality of sensors of the sensor array that receives the light output by the light emitter to indicate a current parameter associated with a current orientation of an agricultural implement of the agricultural system relative to a work vehicle of the agricultural system, determine a target parameter associated with a desirable orientation of the agricultural implement relative to the work vehicle based on an operation of the agricultural system, and output a control signal in response to determining that the current parameter indicated by the at least one sensor that receives the light does not match the target parameter.

10 Claims, 6 Drawing Sheets

(56) References Cited

U.S. PATENT DOCUMENTS

| | | |
|---|---|---|
| 2010/0017075 A1 | 1/2010 | Beaujot |
| 2011/0196575 A1 | 8/2011 | Scharmüller, Sr. et al. |
| 2012/0283909 A1 | 11/2012 | Dix |
| 2016/0252909 A1* | 9/2016 | Webber ............... A01B 79/005 701/41 |
| 2016/0270286 A1* | 9/2016 | Boydens ............. A01B 69/003 |
| 2018/0279539 A1 | 10/2018 | Wägner |
| 2019/0059199 A1 | 2/2019 | Stanhope |
| 2019/0111744 A1 | 4/2019 | Billich |
| 2019/0392239 A1* | 12/2019 | Ferrari ................ A01B 79/005 |
| 2020/0359543 A1* | 11/2020 | Dix ....................... A01B 63/14 |
| 2022/0299635 A1* | 9/2022 | Sergeev .............. G06V 20/188 |

\* cited by examiner

POSITION MONITORING SYSTEM FOR AGRICULTURAL SYSTEM

BACKGROUND

The disclosure relates generally to a position monitoring system for an agricultural system.

This section is intended to introduce the reader to various aspects of art that may be related to various aspects of the present disclosure, and are described below. This discussion is believed to be helpful in providing the reader with background information to facilitate a better understanding of the various aspects of the present disclosure. Accordingly, it should be noted that these statements are to be read in this light, and not as admissions of prior art.

Agricultural systems are used to farm a field, and a particular agricultural system may include a work vehicle and an agricultural implement towed behind the work vehicle. The agricultural implement may perform a farming operation, such as tilling, planting, and so forth, and the work vehicle may move across a field to drive the agricultural implement across the field. In some instances, the agricultural implement may be oriented undesirably relative to the work vehicle. The undesirable orientation of the agricultural implement relative to the work vehicle may reduce a performance of the agricultural system in the farming operation.

BRIEF DESCRIPTION

A summary of certain embodiments disclosed herein is set forth below. It should be noted that these aspects are presented merely to provide the reader with a brief summary of these certain embodiments and that these aspects are not intended to limit the scope of this disclosure. Indeed, this disclosure may encompass a variety of aspects that may not be set forth below.

In certain embodiments, a position monitoring system for an agricultural system includes a light emitter configured to output a light, a sensor array having a plurality of sensors configured to receive the light output by the light emitter, and a control system configured to determine at least one sensor of the plurality of sensors of the sensor array that receives the light output by the light emitter to indicate a current parameter associated with a current orientation of an agricultural implement of the agricultural system relative to a work vehicle of the agricultural system, determine a target parameter associated with a desirable orientation of the agricultural implement relative to the work vehicle based on an operation of the agricultural system, and output a control signal in response to determining that the current parameter indicated by the at least one sensor that receives the light does not match the target parameter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure relate to an agricultural system used to farm a field. The agricultural system may include an agricultural implement that may perform a farming operation. The agricultural implement may be attached to a work vehicle that moves across the field to enable the agricultural implement to perform the farming operation on the field. In some cases, the agricultural implement may be at an undesirable orientation relative to the work vehicle during operation of the agricultural system. As an example, the contour of the field may be uneven, such as having slopes, dips, bumps, and the like. The unevenness of the field may cause the agricultural implement to rotate relative to the work vehicle to an undesirable orientation. As another example, inadvertent navigation (e.g., inadvertent turning) of the agricultural system may cause the undesirable orientation of the agricultural implement relative to the work vehicle. Continued operation of the agricultural system while the agricultural implement is in an undesired orientation relative to the work vehicle may reduce performance of the agricultural system. For example, the agricultural implement may perform operations on certain areas of the field incompletely or inefficiently.

Thus, it is desired to monitor the orientation of the agricultural implement relative to the work vehicle to determine if the agricultural system is operating efficiently. In the embodiments disclosed herein, the agricultural system may include a position monitoring system configured to determine the orientation of the agricultural implement. For example, the position monitoring system may include a light emitter and a sensor array. The light emitter may be attached to one of the work vehicle or the agricultural implement, and the sensor array may be attached to the other of the work vehicle or the agricultural implement. During operation of the position monitoring system, the light emitter may be configured to output a light toward the sensor array. A particular one of the sensors of the sensor array may receive the light depending on the orientation of the agricultural implement relative to the work vehicle.

The position monitoring system may also include a control system configured to determine whether the orientation of the agricultural implement relative to the work vehicle is desirable based on the receipt of the light at the sensor array. For example, the control system may determine a particular sensor receiving the light output by the light emitter. The control system may also determine an operation (e.g., an operating mode, such as a farming operation being performed; a navigation operation, such as turning) of the agricultural system and determine a target parameter based on the operation. In some embodiments, the target parameter may include a target sensor to receive the light output by the light emitter. In additional or alternative embodiments, the target parameter may include a target angle between the agricultural implement and the work vehicle, and the control system may determine a current angle between the agricultural implement and the work vehicle based on the particular sensor receiving the light. The control system may output a control signal to cause adjustment of the orientation of the agricultural implement relative to the work vehicle to cause the target sensor to receive the light and/or to adjust the current angle toward the target angle. The control signal may cause a notification to be presented to an operator of the agricultural system and/or cause automatic adjustment of the orientation of the agricultural implement relative to the work vehicle. Thus, the control system may facilitate achievement of a desirable orientation of the agricultural implement relative to the work vehicle to enable desirable (e.g., efficient) operation of the agricultural system.

Figure 1:
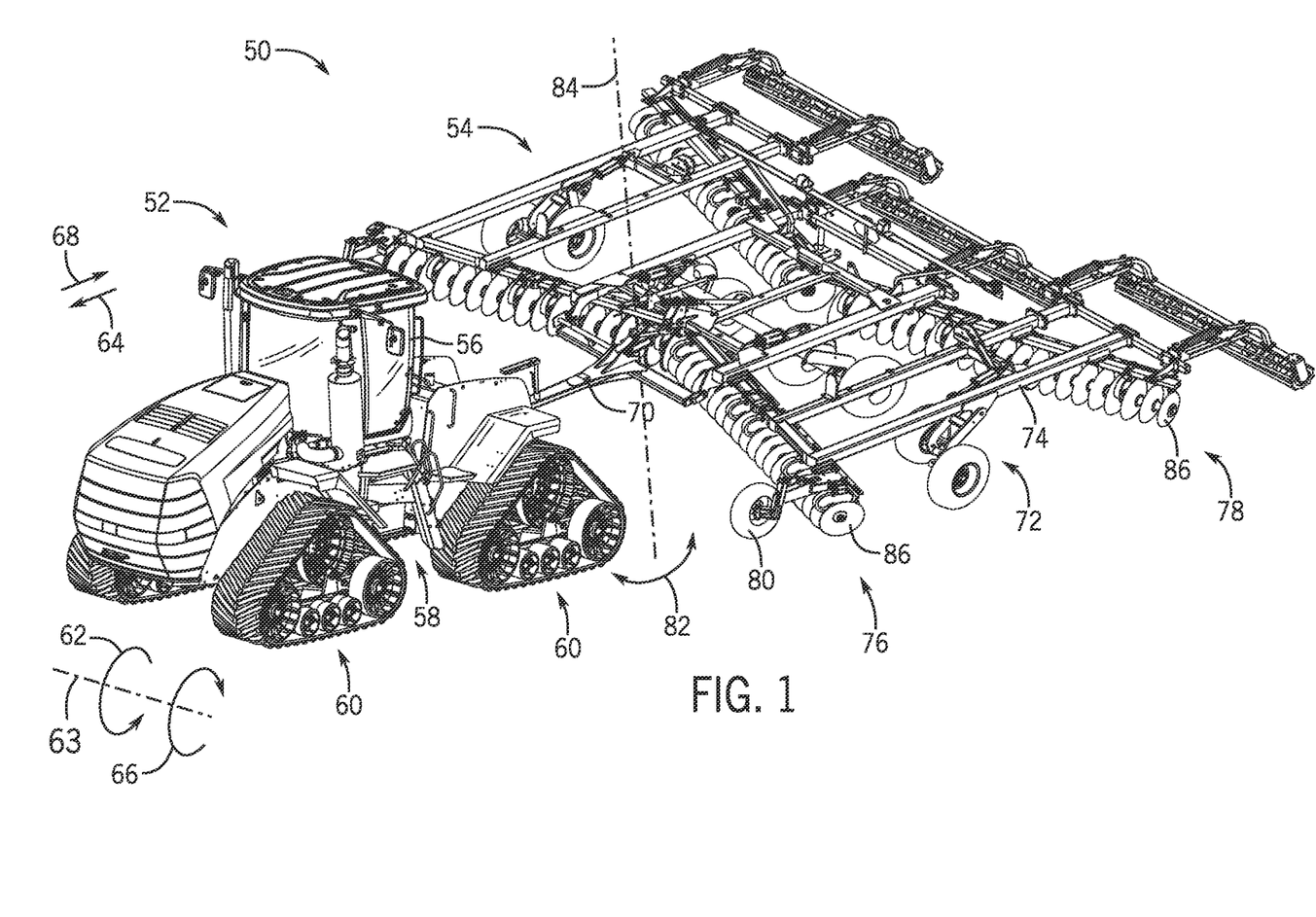
FIG. 1 is a perspective view of an embodiment of an agricultural system having a work vehicle and an agricultural implement, in accordance with an aspect of the present disclosure.

Turning to the drawings, FIG. 1 is a perspective view of an embodiment of an agricultural system 50 that includes a work vehicle 52 and an agricultural implement 54. In the illustrated embodiment, the work vehicle 52 is a tractor. However, in some embodiments, the work vehicle 52 may be an on-road truck, a harvester, and so forth, that may be driven over a field, such as a farming field. As illustrated, the work vehicle 52 includes a cab 56 mounted on a chassis 58. The chassis 58 may support components, such as a motor, a hydraulic system (e.g., a pump, valves, a reservoir), an electrical system (e.g., a control system), a cooling system (e.g., an engine coolant system, a heating, ventilation, and/or air conditioning system), and the like, to facilitate operation of the work vehicle 52. Additionally, the work vehicle 52 includes tracks 60 that operate to move the work vehicle 52. For example, the front and/or the rear tracks 60 may rotate in a first rotational direction 62 (e.g., a forward rotational direction) about a lateral axis 63 to drive the work vehicle 52 in a first direction 64 (e.g., a forward direction), and the front and/or rear tracks 60 may rotate in a second rotational direction 66 (e.g., a reverse rotational direction) about the lateral axis 63, opposite the first rotational direction 62, to drive the work vehicle 52 in a second direction 68 (e.g., a backward direction), opposite the first direction 64. The tracks 60 (e.g., the front tracks and/or the rear tracks) may also be steered to turn the work vehicle 52. In additional or alternative embodiments, a portion (e.g., a rear portion) of the chassis may rotate relative to a remaining portion (e.g., a front portion) of the chassis to steer the work vehicle. While the work vehicle includes tracks in the illustrated embodiment, in other embodiments, the work vehicle may include wheels or a combination of wheels and tracks.

The cab 56 is configured to house an operator of the work vehicle 52 during operation of the agricultural system 50. The cab 56 may provide access to various controls of the work vehicle 52. For example, the cab 56 may include a user interface to enable the operator to control the operation of certain systems of the work vehicle 52. In some embodiments, the cab 56 may include a component, such as a steering wheel, to enable the operator to steer the tracks 60 to turn the work vehicle 52. In addition, the cab 56 may include other and/or additional types of user interfaces (e.g., a touch screen, a hand controller, a push button, a track pad) configured to receive user input or feedback for controlling various operations and systems of the work vehicle 52.

Moreover, the chassis 58 is coupled to the agricultural implement 54 to enable the work vehicle 52 to tow the agricultural implement 54. For example, the chassis 58 may be coupled to a hitch 70 of the agricultural implement 54 (e.g., via a corresponding hitch of the work vehicle). In addition, the agricultural implement 54 includes main wheels 72 that enable the agricultural implement 54 to move, such as over the field through which the work vehicle 52 is navigating. Thus, movement of the work vehicle 52 drives movement of the agricultural implement 54. For example, movement of the work vehicle 52 in the first direction 64 drives the agricultural implement 54 to move in the first direction 64, and movement of the work vehicle 52 in the second direction 68 drives the agricultural implement 54 to move in the second direction 68. In certain embodiments, the agricultural implement 54 may also be steerable. By way of example, the main wheels 72 may be turned to steer the agricultural implement 54.

In some embodiments, the agricultural implement 54 may be a tilling implement (e.g., vertical tilling implement) configured to break up soil within the field during operation of the agricultural system 50. The agricultural implement 54 includes a frame 74 to which the main wheels 72 are coupled. As illustrated in FIG. 1, the main wheels 72 are located between a first end 76 (e.g., front end) of the agricultural implement 54 and a second end 78 (e.g., rear end) of the agricultural implement 54. The agricultural implement 54 includes gauge wheels 80 that are coupled to the frame 74, such as at the first end 76. The gauge wheels 80 may be used to reduce an amount of lateral and/or vertical movement of the agricultural implement 54 while the agricultural system 50 is in operation. For example, the gauge wheels 80 may engage the soil surface while the work vehicle 52 tows the agricultural implement 54, such that movement of the agricultural implement 54 along the lateral axis 63 and/or movement of the agricultural implement 54 along a vertical axis 84 is reduced.

The agricultural implement 54 also includes disc blades 86 that are coupled to the frame 74. In the illustrated embodiment, the disc blades 86 of the agricultural implement 54 are arranged in rows. In some embodiments, the blade rows may form an X-shaped configuration on the agricultural implement 54. In additional or alternative embodiments, the disc blades may be arranged in a different configuration on the agricultural implement (e.g., a k-shaped configuration, a diamond configuration, a parallel configuration), and/or the agricultural implement may include a different quantity of rows of disc blades.

During operation of the agricultural system 50, the disc blades 86 may engage soil of the field. For instance, the main wheels 72 may be positioned to set the position of the frame 74 at a target height above the soil surface. By way of example, the main wheels 72 may move (e.g., translate, rotate) away from the frame 74 to move the frame 74 away from the soil surface, and the main wheels 72 may move toward the frame 74 to move the frame 74 toward the soil surface. As the agricultural implement 54 is towed by the work vehicle 52, the disc blades 86 may rotate while engaged with the soil to till the soil. Each disc blade 86 may, for example, be non-translatably coupled to the frame 74, such that movement of the main wheels 72 relative to the frame 74 changes the position of the disc blades 86 relative to the soil surface (e.g., to engage or disengage the disc blades 86 from the soil). In some embodiments, the disc blades 86 may be concave and/or may have certain surface features (e.g., flutes) that facilitate tilling of the soil. In additional or alternative embodiments, the agricultural implement may include other suitable type(s) of ground engaging tool(s), such as tillage points, tines, and so forth.

Although the position of the disc blades 86 relative to the soil surface is adjusted by controlling the position of the main wheels in the illustrated embodiment, in additional or alternative embodiments, the position of the disc blades may be adjusted in other manners. For example, the hitch may be raised and/or lowered relative to the soil surface (e.g., via adjustment of the hitch of the work vehicle) to adjust the position and/or a pitch of the agricultural implement, thereby adjusting the position of the disc blades relative to the soil surface. In further embodiments, the disc blades may be directly adjustable relative to the implement frame. For example, groups of disc blades may be adjustable via a subframe of the agricultural implement.

In additional or alternative embodiments, the agricultural implement may have any suitable alternate configuration, such as having no gauge wheels, no main wheels, any other suitable configuration, or any combination thereof. The agricultural implement may also have a different type or configuration of a tilling implement, or the agricultural implement may be a different type of implement, such as a planter, a seeder, a harvester, a sprayer, a mower, and the like, and may be configured to perform a different operation on the field.

Figure 2:
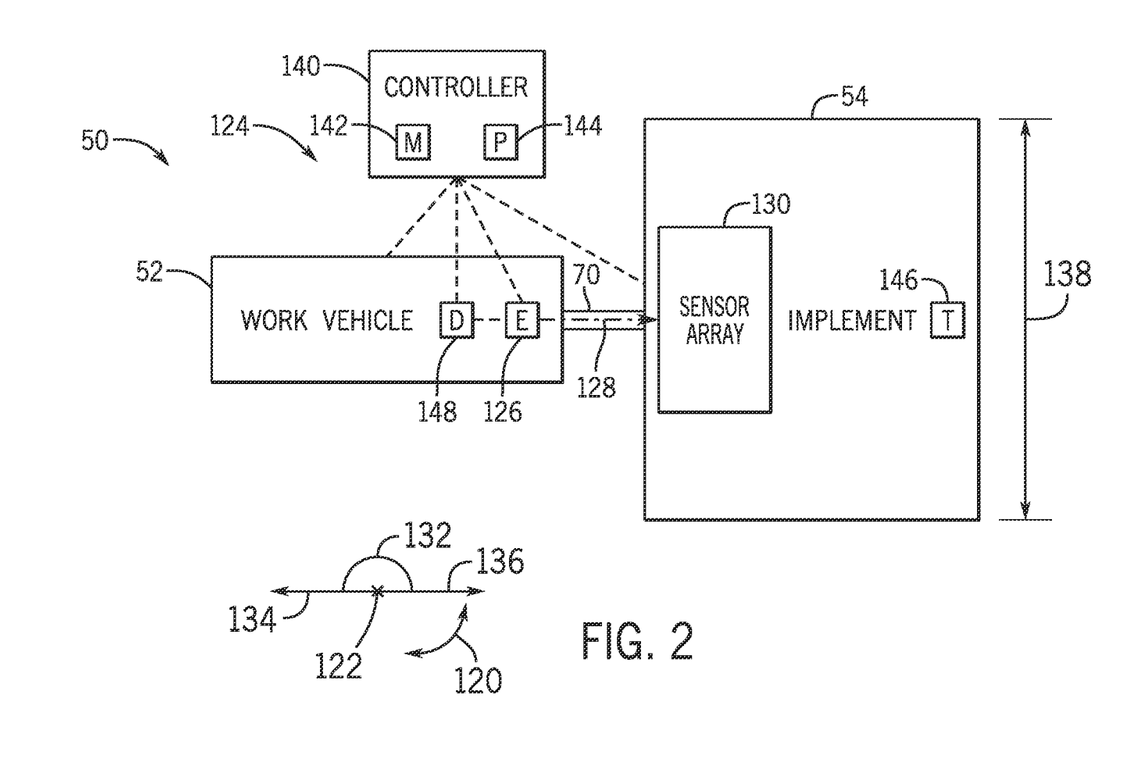
FIG. 2 is a schematic diagram of an embodiment of an agricultural system having a work vehicle and an agricultural implement, in accordance with an aspect of the present disclosure.

FIG. 2 is a schematic diagram of an embodiment of an agricultural system 50 having a work vehicle 52 and an agricultural implement 54. The work vehicle 52 and the agricultural implement 54 are connected to and configured to move relative to one another via a hitch 70. For instance, the work vehicle 52 and the agricultural implement 54 may rotate relative to one another in rotational directions 120 about an axis 122 (e.g., a vertical axis). In some circumstances, during operation of the agricultural system 50, the agricultural implement 54 may be at an undesired orientation relative to the work vehicle 52. For example, the terrain of the field (e.g., a hill, a dip, an obstacle) may cause the agricultural implement 54 to move, such as yaw, in the rotational directions 120, and the resulting angle between the work vehicle 52 and the agricultural implement 54 may be undesirable.

For this reason, the agricultural system 50 includes a position monitoring system 124 configured to monitor the orientation of the agricultural implement 54 relative to the work vehicle 52. The position monitoring system 124 may include a light emitter 126 disposed on the work vehicle 52. The light emitter 126 may be configured to output a light, such as in an output direction 128 (e.g., a linear direction), which may be a rearward direction toward the agricultural implement 54. By way of example, the light output by the light emitter 126 may include a laser light, an infrared light, or any other suitable light (e.g., visible light, invisible light).

The position monitoring system 124 may also include a sensor array 130 disposed on the agricultural implement 54 and configured to receive the light output by the light emitter 126. The sensor array 130 may include multiple sensors coupled to (e.g., via a fastener, via an adhesive) the agricultural implement 54. Each sensor may include any suitable sensor, such as a light detector, configured to receive the light output by the light emitter 126. The orientation of the agricultural implement 54 relative to the work vehicle 52 may cause a particular one of the sensors to receive the output light. As such, the sensor(s) that receive the light may be indicative of the orientation of the agricultural implement 54 relative to the work vehicle 52, such as an angle 132 (e.g., a yaw angle) between the work vehicle 52 and the agricultural implement 54 about axes 134, 136 (e.g., horizontal axes). For example, the axes 134, 136 may extend parallel to one another such that the angle 132 is equal to 0 degrees while the work vehicle 52 and the agricultural implement 54 are aligned with one another (e.g., the work vehicle 52 and the agricultural implement 54 travel in a straight manner). To this end, the sensors of the sensor array 130 may be arranged in a side-by-side configuration, such as along a dimension 138 (e.g., a width) of the agricultural implement 54 (e.g., along the axis 136). As such, the sensor array 130 may include a row of sensors disposed along the dimension 138.

The position monitoring system 124 may also include a control system 140 (e.g., a programmable controller, an electronic controller, an automation controller, a cloud computing system) communicatively coupled to the sensor array 130 and/or the light emitter 126. The control system 140 may be disposed on the work vehicle 52, on the agricultural implement 54, or at a remote location and configured to operate the agricultural system 50. The control system 140 includes a memory 142 and a processor 144 (e.g., processing circuitry) configured to execute software code or instructions stored on the memory 142, such as to control operation of various components of the agricultural system 50 (e.g., of the position monitoring system 124). The term "code" or "software code" used herein refers to any instructions or set of instructions that control the operation of the control system 140. The code or software code may exist in a computer-executable form, such as machine code, which is the set of instructions and data directly executed by the processor 144 of the control system 140, human-understandable form, such as source code, which may be compiled in order to be executed by the processor 144 of the control system 140, or an intermediate form, such as object code, which is produced by a compiler. As used herein, the term "code" or "software code" also includes any human-understandable computer instructions or set of instructions, such as a script, that may be executed on the fly with the aid of an interpreter executed by the processor 144 of the control system 140.

As an example, the memory 142 may store processor-executable software code or instructions (e.g., firmware or software), which are tangibly stored on a tangible computer readable medium. Additionally or alternatively, the memory may store data (e.g., data associated with a respective orientation of the agricultural implement 54 with respect to each sensor that receives light). As an example, the memory 142 may include a volatile memory, such as random access memory (RAM), and/or a nonvolatile memory, such as read-only memory (ROM), flash memory, a hard drive, or any other suitable optical, magnetic, or solid-state storage medium, or a combination thereof. Furthermore, the processor 144 may include multiple microprocessors, one or more "general-purpose" microprocessors, one or more special-purpose microprocessors, and/or one or more application specific integrated circuits (ASICS), or some combination thereof. For example, the processor 144 may include one or more reduced instruction set (RISC) or complex instruction set (CISC) processors.

The control system 140 may be configured to operate the light emitter 126 during operation of the position monitoring system 124 (e.g., during operation of the agricultural system 50). The control system 140 may also be configured to determine the current sensor(s) of the sensor array 130 that receives the light output by the light emitter 126. In some embodiments, the control system 140 may determine the sensor(s) that receives the light based on sensor signal(s) output by the sensor(s) (e.g., the signal(s) may indicate receipt of the light at the sensor(s)). In additional or alternative embodiments, the light emitter may output light to an additional object (e.g., a retroreflective object), the additional object may deflect the light toward the sensor array, and the control system may determine the sensor(s) that receive the light deflected off the additional object. In further embodiments, receipt of the light may change an appearance of a sensor, and the control system may inspect (e.g., visually inspect) each sensor and determine the sensor that receives the light based on the appearance of the sensor.

The control system 140 may operate based on the current sensor(s) that receives light. For example, the control system 140 may operate to cause desirable orientation of the agricultural implement 54 relative to the work vehicle 52. In some embodiments, the control system 140 may determine target sensor(s) of the sensor array 130 to receive the light based on the operation of the agricultural system 50. The target sensor(s) may include the sensor(s) that receive the light while the agricultural implement 54 is in a desirable orientation relative to the work vehicle 52. The control system 140 may compare the current sensor(s) that receive the light with the target sensor(s) to determine whether the orientation of the agricultural implement 54 relative to the work vehicle 52 is desirable. In response to determining that the current sensor(s) and the target sensor(s) match one another (e.g., a difference between the current sensor(s) and the target sensor(s) is below a threshold), which indicates that a current orientation of the agricultural implement 54 relative to the work vehicle 52 is desirable, the control system 140 may continue a current operation of the agricultural system 50.

However, in response to determining that the current sensor(s) and the target sensor(s) do not match one another (e.g., a difference between the current sensor(s) and the target sensor(s) is above a threshold), which indicates that a current orientation of the agricultural implement 54 relative to the work vehicle 52 is undesirable, the control system 140 may output a control signal to cause adjustment of the orientation of the agricultural implement 54 relative to the work vehicle 52. As an example, the control system 140 may output a control signal to adjust operating parameter(s) (e.g., a steering angle, a ground speed) of the work vehicle 52 and/or of the agricultural implement 54. Such a control signal may, for instance, adjust the steering wheel of the work vehicle 52, the tracks of the work vehicle 52, the wheels of the agricultural implement 54, engagement between the agricultural implement 54 (e.g., an engagement tool 146 of the agricultural implement) and the field, and so forth, to change the orientation of the agricultural implement 54 relative to the work vehicle 52. Thus, the control signal output by the control system 140 may automatically adjust the orientation of the agricultural implement 54 relative to the work vehicle. In some embodiments, the control system may be communicatively coupled to a separate controller (e.g., a work vehicle controller, an agricultural implement controller) that directly controls the operation of the work vehicle and/or of the agricultural implement, and the control signal output by the control system may instruct the separate controller to control the work vehicle and/or the agricultural implement to adjust the orientation of the agricultural implement relative to the work vehicle.

As another example, the control signal may cause a display 148 of the work vehicle 52 to present a notification and/or other information (e.g., within the user interface in the cab). The notification may indicate a recommended operational adjustment, the orientation of the agricultural implement 54 relative to the work vehicle 52, the sensor(s) that receive light, and/or any other suitable information that may urge the user to control operation of the agricultural system 50 to adjust the orientation of the agricultural implement 54 relative to the work vehicle 52. In this manner, the user may manually adjust the orientation of the agricultural implement 54 relative to the work vehicle 52 based on the notification. In either embodiment, the control signal output by the control system 140 may prompt the orientation of the agricultural implement 54 relative to the work vehicle 52 to be adjusted toward a desirable orientation, thereby adjusting the direction of the light output by the light emitter 126 toward the target sensor(s).

In additional or alternative embodiments, the control system may determine a current angle between the work vehicle and the agricultural implement based on the current sensor(s) that receive the light from the emitter. The control system may also determine a target angle between the work vehicle and the agricultural implement based on the operation of the agricultural system, the target angle corresponding to a desirable orientation of the agricultural implement relative to the work vehicle. The control system may then compare the current angle with the target angle to determine whether the orientation of the agricultural implement relative to the work vehicle is desirable. In response to determining that the current angle and the target angle match one another (e.g., the current angle and the target angle is below a threshold, such as 1 to 5 degrees, 5 to 10 degrees, 10 to 15 degrees), the control system may continue a current operation of the agricultural system. However, in response to determining that the current angle and the target angle do not match one another (e.g., the current angle and the target angle is above a threshold), the control system may output a control signal to adjust the orientation of the agricultural implement relative to the work vehicle. In this way, the control system may be configured to determine a parameter, which may include either the sensor(s) or the angle, indicated by the sensor(s) that receive light, compare the parameter to a target parameter, and output the control signal in response to determining a mismatch between the parameter and the target parameter.

It should be noted that the work vehicle 52 may be configured to couple to different agricultural implements 54, and the sensor array 130 or a different sensor array may be disposed on the different agricultural implements 54. For example, the sensor array 130 may be removably coupled to each agricultural implement 54 to enable the sensor array 130 to be interchangeably disposed on different agricultural implements 54. The control system 140 may be configured to utilize the sensor array 130 disposed on different agricultural implements 54 to adjust operation of the agricultural system 50. For example, the control system 140 may be configured to determine the target sensor(s) and/or the target angle associated with desirable orientation of the agricultural implement 54 relative to the work vehicle 52, and the control system 140 may operate based on whether current sensor(s) match the target sensor(s) and/or a current angle matches the target angle. In this manner, the control system 140 of the position monitoring system 124 may be configured to enable desirable operation of the agricultural system 50 that uses any suitable agricultural implement 54.

Moreover, existing agricultural systems may be retrofitted with the position monitoring system 124. That is, the light emitter 126 may be disposed onto an existing work vehicle, the sensor array 130 may be disposed onto an existing agricultural implement, and/or the control system 140 may be used to control the operation of the existing work vehicle and/or the existing agricultural implement based on receipt of the light at the sensor array 130. In certain embodiments, the position monitoring system 124 may be a kit that includes the light emitter 126, the sensor array 130, the control system 140, or a combination thereof that may be readily implemented onto any existing agricultural system (e.g., an existing work vehicle, an existing agricultural implement).

Although the illustrated agricultural system 50 includes the light emitter disposed on the work vehicle 52 and the sensor array disposed on the agricultural implement 54, in additional or alternative embodiments, the light emitter may be disposed on the agricultural implement, and the sensor array may be disposed on the work vehicle. Moreover, the techniques described herein may be used to determine and/or adjust orientation of the work vehicle and the agricultural implement in other manners. That is, the sensor(s) that receive light may indicate a different parameter associated with orientation of the agricultural system, such as an angle (e.g., a pitch angle) between the work vehicle and the agricultural implement about the axes 122, 134 and/or an angle (e.g., a roll angle) between the work vehicle and the agricultural implement about the axis 134. To this end, the sensors of the sensor array may be arranged in another suitable manner relative to one another, such as in a direction along a height of the agricultural implement (e.g., crosswise to the dimension 138, along the axis 122), in a two-dimensional array (e.g., a grid pattern, a spiral pattern, a radial pattern), in a three-dimensional array (e.g., a prismatic pattern, a spherical pattern). Indeed, the sensor array may additionally or alternatively include a column of sensors.

Moreover, in some embodiments, the position monitoring system may include any suitable quantity of light emitters, sensor arrays, sensors (e.g., in each sensor array), such as multiple light emitters, multiple sensor arrays, and/or a different quantity of sensors in respective sensor arrays. The use of multiple light emitters and/or multiple sensor arrays may enable the orientation of the agricultural implement 54 relative to the work vehicle 52 to be determined with greater accuracy and/or along a larger quantity of axes. For instance, multiple determinations of the orientation of the agricultural implement 54 relative to the work vehicle 52 may be performed, and the determinations may be cross-referenced to more accurately determine the orientation of the agricultural implement 54 relative to the work vehicle 52. As an example, the control system 140 may determine a first orientation of the agricultural implement 54 relative to the work vehicle 52 based on first sensor(s) of a first sensor array that receive light, and the control system 140 may determine a second orientation of the agricultural implement 54 relative to the work vehicle 52 based on second sensor(s) of a second sensor array that receive light. The control system 140 may verify the current orientation of the agricultural implement 54 relative to the work vehicle 52 based on the first determined orientation and the second determined orientation matching one another. However, if the first determined orientation does not match the second determined orientation, the control system 140 may determine the current orientation based on an adjustment of the first determined orientation and/or of the second determined orientation. For example, the control system 140 may utilize an average (e.g., mathematical mean) of the first orientation and the second orientation as the orientation of the agricultural implement 54 relative to the work vehicle 52.

Further still, the position monitoring system may utilize an additional or alternative type of sensor to enable the control system to determine the orientation of the agricultural implement relative to the work vehicle. Such sensors may include a distance sensor, a proximity sensor, and the like. The control system may be communicatively coupled to the sensor and configured to determine whether a current reading or measurement of the sensor matches a target reading indicative of a desirable orientation of the agricultural implement relative to the work vehicle. The control system may then output a control signal in response to determining the current reading does not match the target reading to adjust the orientation of the agricultural implement relative to the work vehicle. Indeed, the control system may operate using multiple different sensors. That is, the control system may determine the orientation of the agricultural implement relative to the work vehicle using various types of sensors. For example, the control system may determine a first orientation of the agricultural implement relative to the work vehicle via the sensor array, determine a second orientation of the agricultural implement relative to the work vehicle via another type of sensor, and determine a final orientation of the agricultural implement relative to the work vehicle based on a combination of the first orientation and the second orientation (e.g., an average or mathematical mean of the first orientation and the second orientation). In this way, the control system may utilize another type of sensor to verify the orientation of the agricultural implement relative to the work vehicle indicated by the sensor array.

Figure 3:
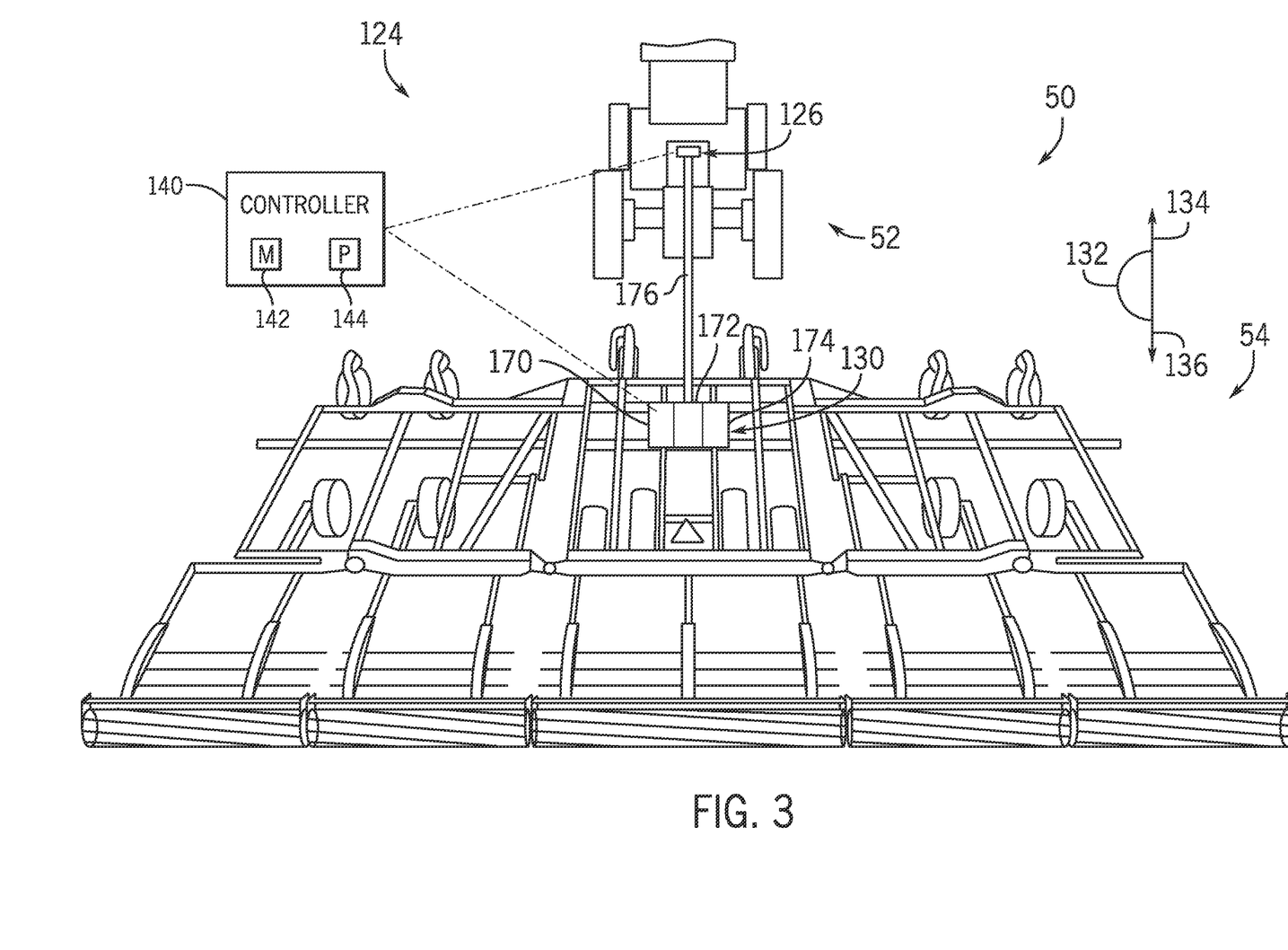
FIG. 3 is a rear perspective view of an embodiment of an agricultural system having a work vehicle and an agricultural implement, in accordance with an aspect of the present disclosure.

FIG. 3 is a rear perspective view of an embodiment of the agricultural system 50 having the work vehicle 52 and the agricultural implement 54. In the illustrated embodiment, the light emitter 126 is coupled to the work vehicle 52, and the sensor array 130 is coupled to the agricultural implement 54. The sensor array 130 includes a first sensor 170, a second sensor 172, and a third sensor 174. Additionally, the light emitter 126 outputs a light 176 toward the agricultural implement 54 for receipt by the sensor array 130. The control system 140 may determine the particular sensor(s) 170, 172, 174 that receive the light 176 and determine whether the particular sensor(s) 170, 172, 174 match target sensor(s) (e.g., a difference between the particular sensor(s) 170, 172, 174 and the target sensor(s) is below a threshold)

and/or whether an angle corresponding to the particular sensor(s) 170, 172, 174 matches a target angle (e.g., a difference between the angle and the target angle is below a threshold). As an example, based on an operation of the agricultural system 50, the control system 140 may determine that the target sensor includes the second sensor 172 and/or that the target angle includes an angle in which the agricultural implement 54 is longitudinally aligned with the work vehicle 52 (e.g., the angle 132 is 0 degrees). For instance, such an operation of the agricultural system 50 may include navigation of the work vehicle 52 and the agricultural implement 54 in a linear direction.

In the illustrated embodiment, the second sensor 172 receives the light 176 output by the light emitter 126. The control system 140 may determine that the second sensor 172 matches the target sensor and/or that the angle corresponding to receipt of the light 176 at the second sensor 172 matches the target angle. In response, the control system 140 may continue a current operation. For example, the control system 140 may block operations that would cause the adjustment of the orientation of the agricultural implement 54 relative to the work vehicle 52. In certain embodiments, the control system 140 may output a control signal to provide a notification (e.g., via the display) to indicate that the current orientation of the agricultural implement 54 relative to the work vehicle 52 is desirable in response to determining that the second sensor 172 matches the target sensor and/or that the angle corresponding to receipt of the light 176 at the second sensor 172 matches the target angle.

Figure 4:
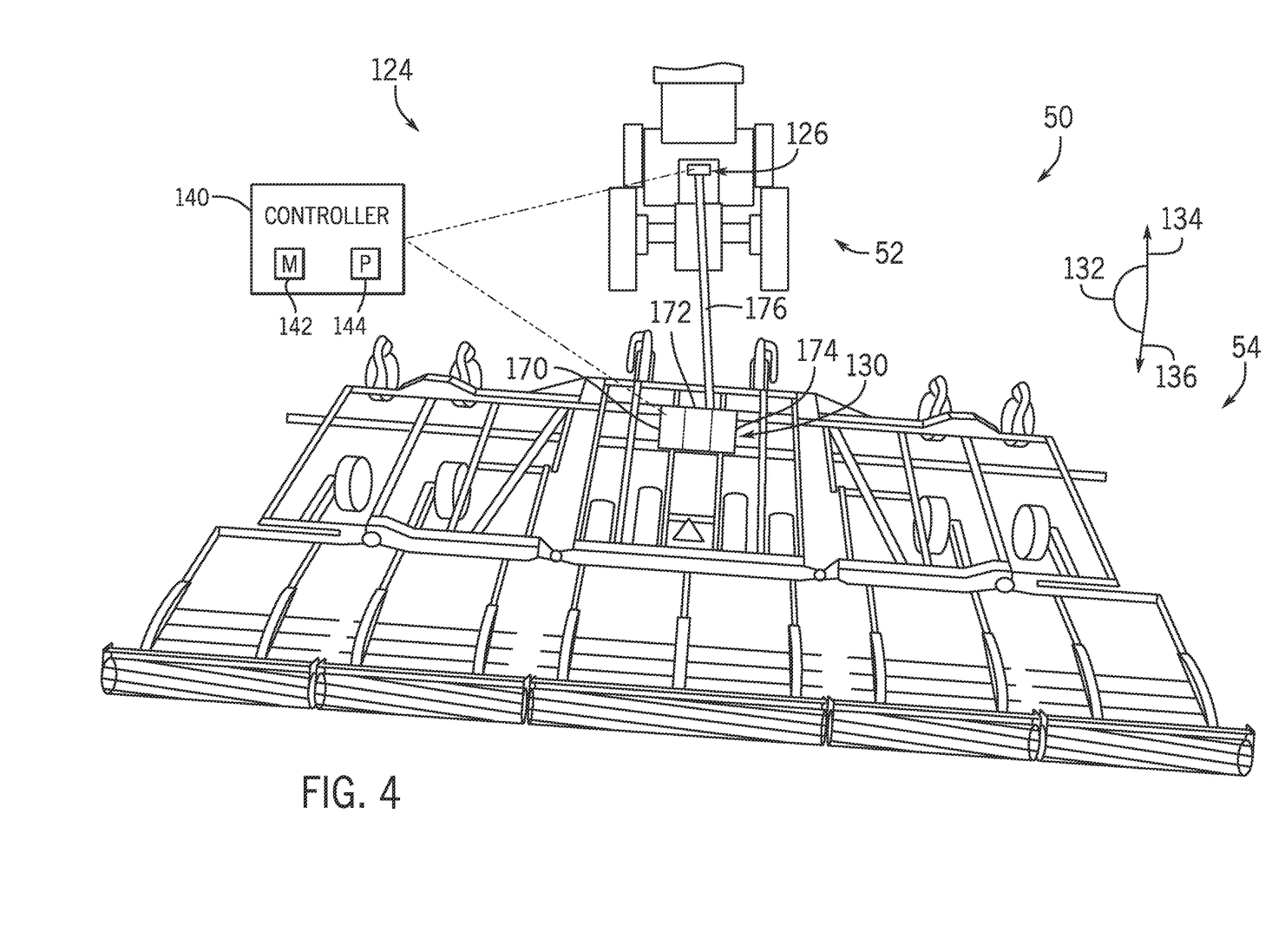
FIG. 4 is a rear perspective view of an embodiment of an agricultural system having a work vehicle and an agricultural implement, in accordance with an aspect of the present disclosure.

FIG. 4 is a rear perspective view of an embodiment of the agricultural system 50 having the work vehicle 52 and the agricultural implement 54. In the illustrated embodiment, the orientation of the agricultural implement 54 relative to the work vehicle 52 causes at least a portion of the light 176 output by the light emitter 126 to be received by the third sensor 174. The control system 140 may determine that the third sensor 174 does not match the target sensor (e.g., the second sensor 172) associated with the operation of the agricultural system 50. Additionally or alternatively, the control system may determine the current angle corresponding to the third sensor receiving the light does not match the target angle associated with the operation of the agricultural system (e.g., a difference between the current angle and the target angle is above a threshold value). In response, the control system 140 may output a control signal that causes adjustment of the orientation of the agricultural implement 54 relative to the work vehicle 52. For example, the control signal may adjust the relative orientation to cause the second sensor 172 (e.g., the target sensor) to receive the light and/or to adjust the current angle between the work vehicle 52 and the agricultural implement 54 toward the target angle.

Figure 5:
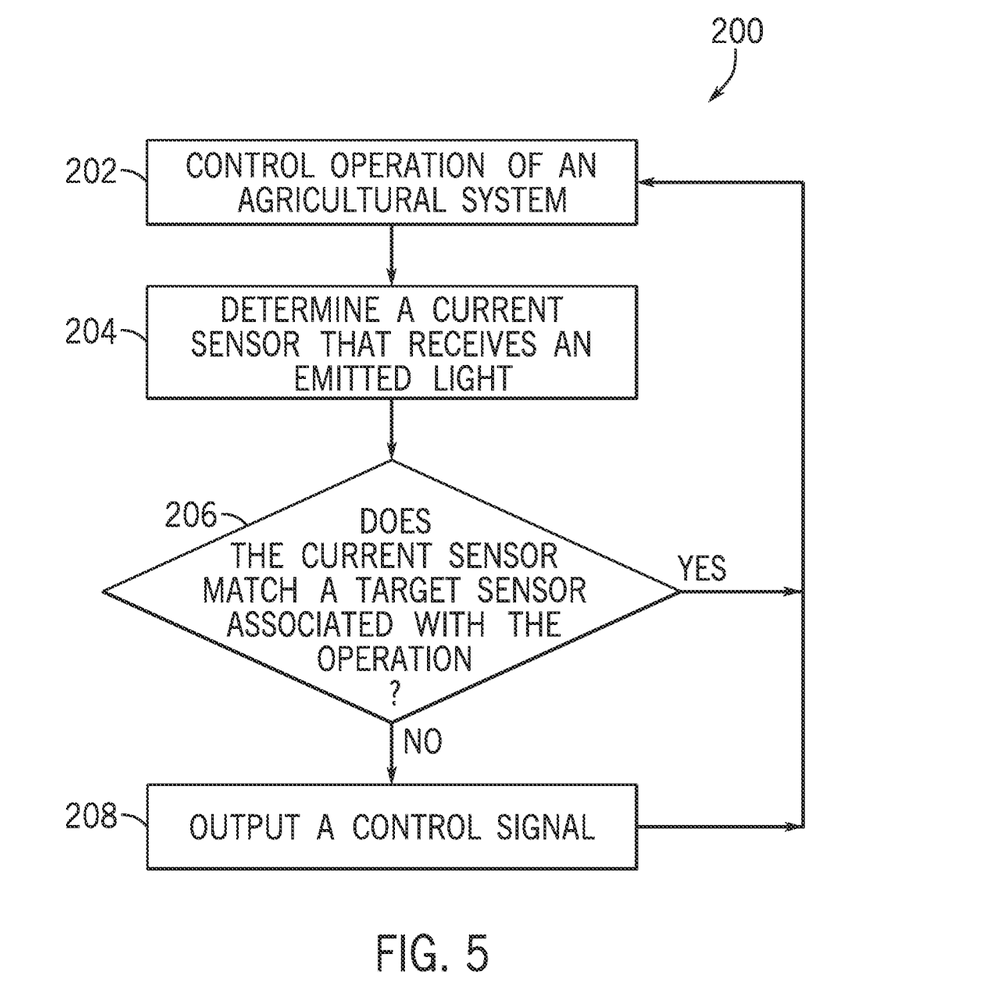
FIG. 5 is a flow diagram of an embodiment of a method for operating an agricultural system based on sensor(s) that receive an emitted light, in accordance with an aspect of the present disclosure.
Figure 6:
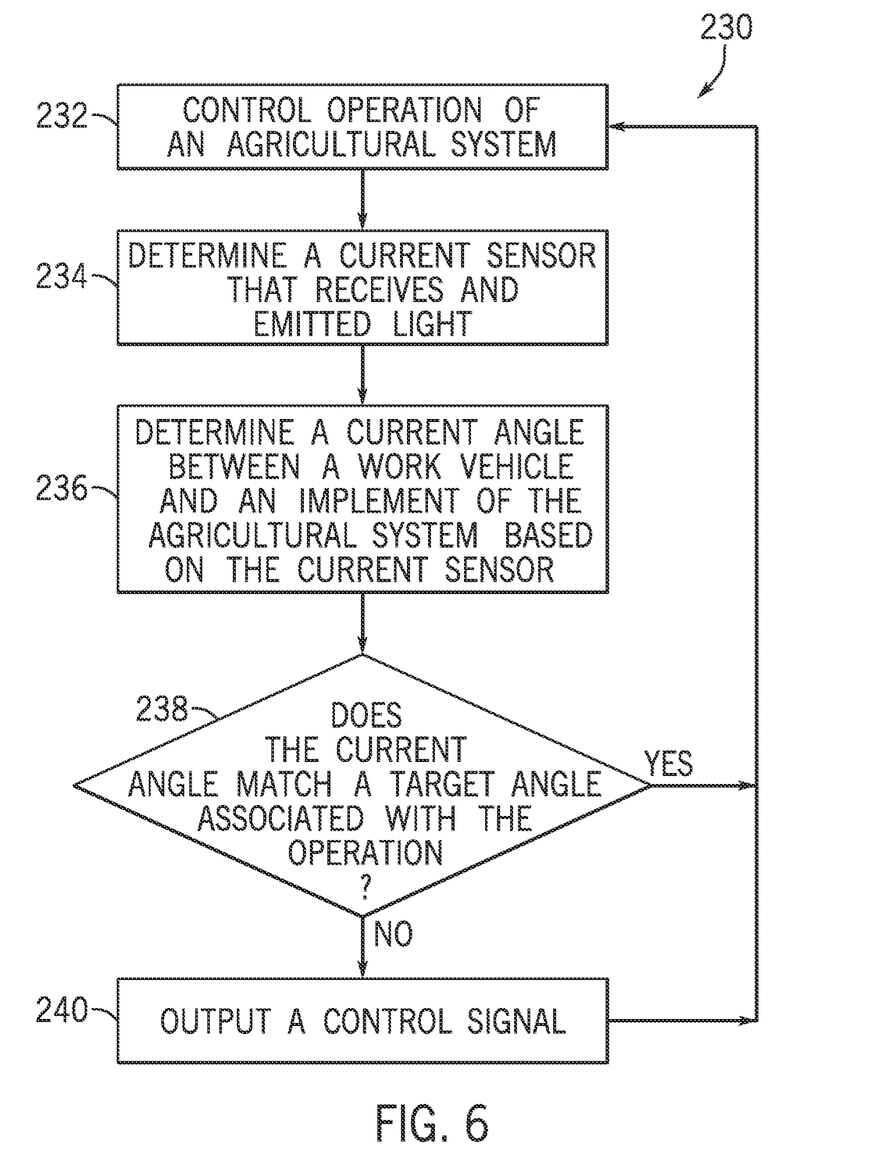
FIG. 6 is a flow diagram of an embodiment of a method for operating an agricultural system based on sensor(s) that receive an emitted light, in accordance with an aspect of the present disclosure.

Each of FIGS. 5 and 6 illustrates a respective method for using the position monitoring system. In some embodiments, each method may be performed by a single respective component or system, such as by the control system 140 (e.g., the processor 144 of the control system 140). In additional or alternative embodiments, multiple components or systems may perform the operations for at least one of the methods. It should also be noted that additional operations may be performed with respect to the described methods. Moreover, certain operations of the depicted methods may be removed, modified, and/or performed in a different order. Further still, certain operations of any of the respective methods may be performed in parallel with one another, such as at the same time, and/or in response to one another.

FIG. 5 is a flow diagram of an embodiment of a method 200 for operating an agricultural system based on sensor(s) that receive an emitted light. At block 202, operation of the agricultural system may be controlled. For example, the agricultural system may be configured to perform multiple different operations, in which the work vehicle moves and drives corresponding movement of the agricultural implement via the hitch coupling the work vehicle to the agricultural implement. Such operations may include different operating modes, such as different types of farming operations that may be performed by the agricultural implement and/or different modes of a particular type of farming operation (e.g., speed of operation, operational load). The operations may additionally or alternatively include different routes, such as different paths in which the agricultural system is to travel, a direction of travel (e.g., a linear direction for straight movement, a curved direction for turning movement) of the agricultural system, a speed of travel of the agricultural system, and so forth. The operations may further include a time of operation, such as a duration of time since initiation of a current operation of the agricultural system. A particular operation may be selected, and operating parameters of the agricultural system may be controlled to effectuate the selected operation of the agricultural system. By way of example, the agricultural system may be operated to travel along a target route or swath (e.g., of a plan). It may be desirable to maintain travel of the agricultural implement along the target route by orienting the agricultural implement in a desirable manner relative to the work vehicle.

For this reason, at block 204, current sensor(s) that receive a light output by a light emitter may be determined. The current sensor(s) may be a part of a sensor array that includes multiple sensors. The current sensor(s) that receive the light may indicate a current orientation of the agricultural implement 54 relative to the work vehicle 52.

At block 206, the current sensor(s) may be compared to target sensor(s) associated with the operation of the agricultural system. For instance, the target sensor(s) may correspond to the desirable orientation of the agricultural implement relative to the work vehicle during the operation of the agricultural system. In response to determining that the current sensor(s) match the target sensor(s) (e.g., a difference between the current sensor(s) and the target sensor(s) is below a threshold difference), which indicates that the current orientation of the agricultural implement relative to the work vehicle is desirable, operation of the agricultural system may continue to be controlled to substantially maintain the current orientation of the agricultural implement relative to the work vehicle. By way of example, an adjustment to the work vehicle and/or to the agricultural implement may be blocked to maintain the current orientation of the agricultural implement relative to the work vehicle.

However, in response to determining that the current sensor(s) do not match the target sensor(s) (e.g., a difference between the current sensor(s) and the target sensor(s) is above a threshold), a control signal may be output, as shown at block 208. The control signal may cause the orientation of the agricultural implement relative to the work vehicle to be adjusted toward the desirable orientation. As an example, the control signal may automatically cause an adjustment to the operation of the work vehicle and/or of the agricultural implement (e.g., by adjusting an operating parameter, such as a steering angle, of the agricultural implement) to cause the light to be output toward the target sensor(s) instead of toward the current sensor(s). For instance, the tracks and/or wheels of the work vehicle may be rotated and/or the wheels of the agricultural implement may be rotated to drive movement of the work vehicle and/or of the agricultural implement relative to one another. Additionally or alternatively, the ground engagement tool may be moved, such as engaged with the ground to act as a pivot point to drive desirable movement (e.g., rotation) of the work vehicle and/or of the agricultural implement (e.g., while the tracks of the work vehicle are being rotated) and/or disengaged from the ground to block undesirable movement of the work vehicle and/or of the agricultural implement (e.g., while the tracks of the work vehicle are being rotated). Any other suitable operational adjustment may be also be performed. To this end, the position of the current sensor(s) relative to the target sensor(s) may be determined. Based on the position of the current sensor(s) relative to the target sensor(s), the adjustment to the operation of the work vehicle and/or of the agricultural implement may be determined. By way of example, the target sensor may be determined to be positioned rightward of the current sensor relative to a path of the light is output by the light emitter. In response, a determination may be made that an adjustment to move the agricultural implement in a leftward direction relative to the work vehicle may enable the target sensor to receive the light.

As another example, the control signal may be output to cause a notification to be presented to an operator of the agricultural system to indicate the orientation of the agricultural implement relative to the work vehicle and/or to indicate an action to be performed to orient the agricultural implement relative to the work vehicle more desirably. Thus, the operator may manually adjust the operation of the work vehicle and/or of the agricultural implement to cause the light to be output toward the target sensor(s) instead of toward the current sensor(s). In either embodiment, the control signal may cause adjustment of the orientation of the agricultural implement relative to the work vehicle to enable the agricultural system to operate desirably. For example, the control signal may enable the orientation of the agricultural implement relative to the work vehicle to be adjusted to align the agricultural implement with the target route.

FIG. 6 is a flow diagram of an embodiment of a method 230 for operating an agricultural system based on sensor(s) that receives an emitted light. At block 232, the operation of the agricultural system may be controlled, such as by using the techniques described above. Additionally, at block 234, the current sensor(s) that receive the emitted light may be determined, such as by using the techniques described above.

At block 236, a current angle between the work vehicle and the agricultural implement may be determined based on the current sensor(s) that receives the emitted light. For example, stored data may associate each sensor with a respective, corresponding angle. Thus, the stored data may be referenced to select the angle corresponding to the current sensor(s) as the current angle between the work vehicle and the agricultural implement.

At block 238, the current angle may be compared to the target angle associated with the operation of the agricultural system. The target angle may correspond to the desirable orientation of the agricultural implement relative to the work vehicle in the operation of the agricultural system. In response to determining that the current angle matches the target angle (e.g., a difference between the current angle and the target angle is below a threshold), which indicates that the current orientation of the agricultural implement relative to the work vehicle is desirable, the operation of the agricultural system may continue to be controlled to maintain the desirable orientation of the agricultural implement relative to the work vehicle.

However, in response to determining that the current angle does not match the target angle (e.g., a difference between the current angle and the target angle is above a threshold), such as based on a difference between the current angle and the target angle being above a threshold value, a control signal may be output, as shown at block 240. The control signal may automatically cause an adjustment to the operation of the work vehicle and/or of the agricultural implement. For example, a difference between the current angle and the target angle may be determined, and the adjustment to the operation of the work vehicle and/or of the agricultural implement may be determined based on the difference between the current angle and the target angle. For instance, the current angle may be 10 degrees in a rightward direction relative to the target angle. In response, a determination may be made that an adjustment to move the agricultural implement 10 degrees in a leftward direction relative to the work vehicle may cause desirable orientation of the agricultural implement relative to the work vehicle. As such, the orientation of the agricultural implement relative to the work vehicle may be adjusted until the angle corresponds to the target angle. The control signal may additionally or alternatively cause a notification to be presented to an operator to cause the operator to manually adjust the operation of the work vehicle and/or of the agricultural implement.

In some embodiments, a different parameter associated with the orientation of the agricultural implement relative to the work vehicle may be determined based on the sensor(s) that receives the emitted light. For example, the parameter may include a distance in which the work vehicle and the agricultural implement are offset (e.g., laterally offset) from one another. A value of the parameter may be compared to a target value of the parameter associated with the operation of the agricultural system, and the agricultural system may be controlled based on the comparison, such as to adjust the value of the parameter toward the target value of the parameter or to maintain the value of the parameter at the target value of the parameter.

In certain embodiments, each of the methods 200, 230 may be repeatedly performed during operation of the agricultural system. For example, the current sensor(s) that receive the emitted light may be determined at a particular frequency, such as at certain time intervals. Thus, the orientation of the agricultural implement relative to the work vehicle may be cyclically monitored to ensure desirable operation of the agricultural system. It should be noted that the agricultural system may perform different operations at different performances of the methods 200, 230. For instance, during a first performance of one of the methods 200, 230, the agricultural system may be in a first operation that includes navigating along a straight path, and a first target sensor associated with the first operation may be determined for comparison to current sensor(s) that receive the emitted light. During a second performance (e.g., a subsequent performance) of such a method 200, 230, the agricultural system may be in a second, updated operation that includes turning along a curved path, and a second, updated target sensor associated with the second operation may be determined for comparison to current sensor(s) that receive the emitted light. In this way, different, updated target sensors may be determined during different performances of the methods 200, 230 in order to achieve a suitable orientation of the agricultural system for different operations.

In some circumstances, during performance of the method 200 and/or of the method 230, a determination may be made that no sensor receives the emitted light, which may also indicate an undesirable orientation of the agricultural implement relative to the work vehicle. Thus, in response to determining a lack of any sensor receiving the emitted light, a control signal may also be output. In some embodiments, the control signal may cause a notification to be presented to indicate that no sensor receives the emitted light. Thus, an operator may manually adjust operations based on the notification. In additional or alternative embodiments, the control signal may automatically adjust the orientation of the agricultural implement relative to the work vehicle. As an example, the control signal may be output based on a previous (e.g., most recent) sensor that received the emitted light. For instance, the previous sensor that received the emitted light may at least partially indicate the current orientation of the agricultural implement relative to the work vehicle. Thus, the control signal may be output based on the previous sensor until a determination is made that a sensor receives the emitted light, at which operation may be performed based on the sensor newly determined to receive the emitted light (e.g., by comparing to the target sensor). As another example, the control signal may suspend the operation of the agricultural system. That is, the work vehicle may no longer operate and move, thereby blocking corresponding movement of the agricultural implement along the field. Suspension of the operation of the agricultural system may block continued undesirable operation of the agricultural system and/or block undesirable adjustment of the orientation of the agricultural implement relative to the work vehicle. Moreover, the suspension of the operation of the agricultural system may enable the operator to inspect the operation of the agricultural system (e.g., the orientation of the agricultural implement relative to the work vehicle) to determine a suitable operational adjustment. In this manner, the control signal output in response to determining an absence of a sensor receiving the emitted light may also facilitate desirable orientation of the agricultural implement relative to the work vehicle.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A position monitoring system for an agricultural system, comprising:
 a light emitter configured to output a light;
 a sensor array comprising a plurality of sensors, wherein each sensor of the plurality of sensors is configured to receive the light output by the light emitter; and
 a control system configured to:
  determine at least one sensor of the plurality of sensors of the sensor array that receives the light output by the light emitter during an operation of the agricultural system, wherein the at least one sensor that receives the light indicates a current orientation of an agricultural implement of the agricultural system relative to a work vehicle of the agricultural system;
  determine at least one target sensor of the plurality of sensors of the sensor array based on the operation of the agricultural system, wherein the at least one target sensor corresponds to a target orientation of the agricultural implement relative to the work vehicle associated with the operation of the agricultural system;
  compare the at least one sensor to the at least one target sensor; and
  control the current orientation of the agricultural implement relative to the work vehicle in response to determining that the at least one sensor does not match the at least one target sensor.

2. The position monitoring system of claim 1, wherein the control system is configured to maintain the current orientation of the agricultural implement in response to determining that the at least one sensor matches the at least one target sensor.

3. The position monitoring system of claim 1, wherein the control system is configured to output a control signal to present a notification associated with the current orientation of the agricultural implement relative to the work vehicle, a recommended operational adjustment of the agricultural system, the at least one sensor that receives the light, or any combination thereof.

4. The position monitoring system of claim 1, wherein the light emitter is configured to output the light as a laser light.

5. At least one non-transitory computer readable medium comprising executable instructions that, when executed by processing circuitry, are configured to cause the processing circuitry to:
 determine at least one sensor of a sensor array of an agricultural system that receives a light output by a light emitter of the agricultural system during an operation of the agricultural system, wherein the at least one sensor that receives the light indicates a current orientation of an agricultural implement of the agricultural system relative to a work vehicle of the agricultural system;
 determine at least one target sensor of the sensor array based on the operation of the agricultural system, wherein the at least one target sensor corresponds to a target orientation of the agricultural implement relative to the work vehicle associated with the operation of the agricultural system;
 compare the at least one sensor to the at least one target sensor; and
 control the current orientation of the agricultural implement relative to the work vehicle in response to determining that the at least one sensor does not match the at least one target sensor.

6. The at least one non-transitory computer readable medium of claim 5, wherein the instructions, when executed by the processing circuitry, are configured to cause the processing circuitry to determine a relative position between the at least one sensor and the at least one target sensor, and wherein controlling the current orientation of the agricultural implement relative to the work vehicle comprises controlling the current orientation of the agricultural implement relative to the work vehicle based on the relative position between the at least one sensor and the at least one target sensor.

7. The at least one non-transitory computer readable medium of claim 6, wherein controlling the current orientation of the agricultural implement relative to the work vehicle comprises controlling wheels of the agricultural system to rotate, moving an engagement tool of the agricultural implement, or both.

8. The at least one non-transitory computer readable medium of claim 5, wherein the instructions, when executed by the processing circuitry, are configured to cause the processing circuitry to:
   determine an absence of any of the sensors of the sensor array receiving the light; and
   output a control signal based on at least one previous sensor of the sensor array that received the light.

9. The at least one non-transitory computer readable medium of claim 5, wherein the instructions, when executed by the processing circuitry, are configured to cause the processing circuitry to:
   determine at least one updated target sensor of the sensor array based on an updated operation of the agricultural system, wherein the at least one updated target sensor corresponds to an updated target orientation of the agricultural implement associated with the updated operation of the agricultural system;
   determine at least one updated sensor of the sensor array that receives the light output by the light emitter during the updated operation of the agricultural system, wherein the at least one updated sensor that receives the light indicates an updated orientation of the agricultural implement;
   compare the at least one updated sensor to the at least one updated target sensor; and
   output a control signal in response to determining that the at least one updated sensor does not match the at least one updated target sensor.

10. The at least one non-transitory computer readable medium of claim 5, wherein the instructions, when executed by the processing circuitry, are configured to cause the processing circuitry to determine the at least one sensor does not match the at least one target sensor based on a difference between the at least one sensor and the at least one target sensor exceeding a threshold.

* * * * *